(12) United States Patent
McKnight

(10) Patent No.: US 10,901,289 B2
(45) Date of Patent: Jan. 26, 2021

(54) REFLECTIVE SPATIAL LIGHT MODULATOR WITH HIGH SPATIAL FREQUENCY BORDER

(71) Applicant: Boulder Nonlinear Systems, Inc., Lafayette, CO (US)

(72) Inventor: Douglas J. McKnight, Boulder, CO (US)

(73) Assignee: BOULDER NONLINEAR SYSTEMS, INC., Lafayette, CO (US)

( * ) Notice: Subject to any disclaimer, the term of this patent is extended or adjusted under 35 U.S.C. 154(b) by 63 days.

(21) Appl. No.: 16/430,128

(22) Filed: Jun. 3, 2019

(65) Prior Publication Data
US 2020/0019036 A1 Jan. 16, 2020

Related U.S. Application Data

(63) Continuation of application No. 15/666,384, filed on Aug. 1, 2017, now Pat. No. 10,310,355.
(Continued)

(51) Int. Cl.
*G02B 26/00* (2006.01)
*G02B 26/08* (2006.01)
(Continued)

(52) U.S. Cl.
CPC .............. *G02F 1/19* (2013.01); *G02F 1/0121* (2013.01); *G02F 1/1333* (2013.01);
(Continued)

(58) Field of Classification Search
CPC ............ G02B 26/0841; G02B 26/0808; G02B 26/001; G02B 26/0833; G02B 27/1026;
(Continued)

(56) References Cited

U.S. PATENT DOCUMENTS 5,844,711 A * 12/1998 Long, Jr. ................. G02B 26/02
359/291
6,700,557 B1 3/2004 McKnight
10,310,355 B2 6/2019 McKnight

OTHER PUBLICATIONS

Communication Technology Institute, "Diffraction Based Laser Projection", "Retrieved from http://www.kt.e-technik.tu-dortmund.de/c,s/en/research/finished_projects/laser_projection/index.html", Nov. 10, 2016, p. 2.
(Continued)

*Primary Examiner* — Brandi N Thomas
(74) *Attorney, Agent, or Firm* — Neugeboren O'Dowd PC

(57) ABSTRACT

A spatial light modulator having an active and a peripheral region, wherein coherent light impinges on both regions, but due to a higher spatial frequency of pixels within the peripheral region, and due to biasing the peripheral region pixels to maximize dispersion of reflected light therefrom, a majority of light reflected from the peripheral region is directed outside of a three-dimensional target window. A spatial frequency of the pixels in the active region is selected such that maximum dispersion of reflected light from the active region is incident within the three-dimensional target window. In this way, incident light that does not reflect from the active region need not be absorbed, or blocked, but instead can be reflected, but still fails to interfere with the target window.

9 Claims, 16 Drawing Sheets

Related U.S. Application Data

(60) Provisional application No. 62/369,490, filed on Aug. 1, 2016.

(51) Int. Cl.
*G02F 1/29* (2006.01)
*G02F 1/19* (2019.01)
*G02F 1/01* (2006.01)
*G02F 1/1333* (2006.01)

(52) U.S. Cl.
CPC ............ *G02F 2001/133388* (2013.01); *G02F 2203/02* (2013.01); *G02F 2203/12* (2013.01); *G02F 2203/50* (2013.01)

(58) Field of Classification Search
CPC ............ G02B 27/1033; G02B 27/141; G02B 23/125; G02B 26/02; G02B 27/09; G02B 5/1828; H04N 9/3155; H04N 5/7458; H04N 21/6408; H04N 21/64322; H04N 9/3102; H04N 2005/745; H04N 2005/7466; H04N 7/012; H04N 9/312; H04N 9/3129; H04N 5/2252; H04N 5/2254; H04N 5/23232; H04N 5/247; H04N 5/33; H04N 5/332; H04N 5/349; H04N 5/3577; H04N 5/3651; H04N 5/3692; H04N 5/378; H04N 9/09; H04N 9/3105; H04N 9/3114; H04N 9/315; H04N 9/3161; G02F 1/017; G02F 1/0121; G02F 1/13454; G02F 1/19; G02F 2203/12; G02F 1/135; G02F 1/1354; G02F 1/1362; G02F 1/1368; G02F 1/218; G02F 1/292; G02F 1/3556; G02F 2001/133302; G02F 2203/22; G02F 2203/24; G02F 2/02; G02F 3/00; G02F 3/022; G02F 3/028
USPC ................ 359/237, 242, 267, 268, 277–279, 359/290–292, 298
See application file for complete search history.

(56) References Cited

OTHER PUBLICATIONS

Jesacher, et al., "Near-Perfect Hologram Reconstruction With a Spatial Light Modulator", "Optical Society of America", Feb. 18, 2008, pp. 2597-2603, vol. 16, No. 4.

* cited by examiner

REFLECTIVE SPATIAL LIGHT MODULATOR WITH HIGH SPATIAL FREQUENCY BORDER

CLAIM OF PRIORITY UNDER 35 U.S.C. § 119

The present application for patent is a continuation of U.S. patent application Ser. No. 15/666,384 entitled "REFLECTIVE SPATIAL LIGHT MODULATOR WITH HIGH SPATIAL FREQUENCY BORDER" filed Aug. 1, 2017, which claims priority to Provisional Application No. 62/369,490 entitled "HIGH SPATIAL FREQUENCY BORDER" filed Aug. 1, 2016, the disclosures of which are incorporated herein by reference in their entireties.

FIELD OF THE DISCLOSURE

The present application relates to optical phase modulation, and more specifically to beam steering using optical phase modulation.

DESCRIPTION OF RELATED ART

Spatial Light Modulators (SLM) are devices for imprinting information on optical beams. This information may be in the form of amplitude modulation, phase modulation, or both. These devices may be controlled optically or electronically. See, for example, "Spatial Light Modulator Technology: Materials, Devices, and Applications (Optical Science and Engineering)", Efron, (Pub. CRC press, 1994), or "Introduction to Microdisplays", Armitage, et al. (Pub. Wiley, 2006), for another overview of the field. In some applications the output of an SLM can use the optical Fourier Transform or diffraction pattern from the SLM. See, for example, "Introduction to Fourier Optics", (J. Goodman, Pub. Roberts &Co., 2005), for a general introduction to the field of Fourier Optics.

Many SLMs have an active area of controllable elements, referred to as "pixels" even though they are often not simple visual "picture elements". As shown in FIGS. 1 and 2, wherein the incident beam extends beyond the pixels, portions of the beam will reflect off the substrate without control and this light can contribute to a bright "zero-order", or "zero-spatial-frequency" (ZSF) spot that can be undesirable in some applications.

FIG. 1 illustrates an SLM system 100 where light from a source 110 is reflected off an SLM 104 having a pixel array 102. A first portion 106 of the SLM 104 reflects the beam, and the beam extends beyond the pixel array 102. A second portion 108 of the SLM 104 does not see incident light (where an edge of the beam is defined by D4σ, 10/90, 20/80, knife-edge, $1/e^2$, full-width half max, or D86 for intensity falloff from the beam center or beam maximum). The SLM 104 uses a Fourier system to reflect the beam through a lens 112 (e.g., a Fourier lens), or multiple lenses, into a target range of angles (or a target volume in some applications). As shown, the SLM 104 is used to focus multiple spots of light within a target volume, where each spot of light has x, y, and z coordinates. A zero-order spot 118 results from a portion of the beam reflecting off a portion of the SLM that is outside or surrounding the pixel array 102.

The pixels can be individually-addressed to modulate the phase and/or amplitude of the incident light. Outside the pixel array 102 there may be a border region that can be electrically driven to a phase and/or amplitude value if desired. In some cases a mechanical feature (e.g., adhesive gasket or a frame, to name two) may be implemented in the region outside the pixel array 102 to block or absorb the incident light. However, it can be impractical to precisely position such a structure adjacent the pixel array 102, and thus unwanted reflections from this region may still occur, thereby leading to a failure to alleviate the zero-order spot 118.

Prior art spatial light modulators have been constructed with "dummy" pixels around the periphery of the active pixel array. The dummy pixels are not individually addressable, and are designed to improve uniformity during the device construction process. These are typically electrically connected together and may be driven to some phase and/or amplitude value if desired.

Some have sought to alleviate the zero-order spot by underfilling the active area. FIGS. 3 and 4 show an SLM arranged to underfill the active area. This technique involves arranging the optical system to reduce the size of the incident beam. There may be a region 302 that receives full-intensity illumination and another region 303 that receives reduced, or greatly reduced, intensity of illumination. This technique does alleviate the zero-order spot, but reduces device performance since active pixels are "wasted" by not being properly illuminated and so are unable to contribute their information to the beam.

Other methods use the setup of FIGS. 1 and 2, but try to block incident light from the peripheral area where there are no active pixels. However, such systems are impractical in practice. For instance, U.S. Pat. No. 6,700,557, which discloses amplitude modulating SLMs, uses peripheral pixels that are biased to "black" or to be largely absorbing rather than reflective. However, for phase-modulating SLMs there is no phase equivalent to "black." Thus, other approaches are desired.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a spatial light modulator having a plurality of individually-addressed phase-modulating pixels. The pixels can be configured to reflect and modify phasing of a beam of coherent light incident on the spatial light modulator to produce reflected light. The phasing can be controlled to steer the reflected light into a target range of angles. The SLM can include a substrate, a first array of individually-addressed reflective phase modulation pixels on the substrate, a first biasing circuitry coupled to the first array, a second array of border pixels on the substrate, and a second biasing circuitry coupled to the second array. The first array can have a first spatial frequency of N and can be configured to apply a plurality of phase modulations to a central portion of the beam. The first biasing circuitry can bias the first array to impart phase delays to the central portion of the beam. In this way, the first biasing circuitry can control steering of a majority of the central portion of the beam within the target range of angles (or within a target volume). The second array can be arranged to surround the first array of pixels, and the second array can have a second spatial frequency of N', where N'>N. The second biasing circuitry can bias pixels of the second array to impart M different phase delays. In this way, the second biasing circuitry can control steering of a majority of the peripheral portion of the beam outside the target range of angles (or a target volume), where M is a number of different groups of pixels in the second array.

Other embodiments of the disclosure may also be characterized as a method of steering reflected light. The method can include arranging an SLM in a path of a coherent beam of light. The SLM can include a substrate. The method may further include arranging a first array of individually-addressed reflective phase modulation pixels on the substrate having a first spatial frequency of N. The method may further include individually biasing pixels of the first array to impart a plurality of phase modulations to a central portion of the beam. The method may further include arranging a second array of border pixels on the substrate surrounding the first array of pixels, the second array of border pixels having a second spatial frequency of N', where N'>N. The method may yet further include biasing groups of pixels in the second array of border pixels to impart M phase modulations to a peripheral portion of the beam, where M is a number of different groups of pixels in the second array of border pixels.

Other embodiments of the disclosure can be characterized as a spatial light modulator including a first array of individually-addressed pixels, a second array of border pixels, and control circuitry. The first array has a first spatial frequency and the second array has a second spatial frequency, higher than the first. The border pixels can be arranged around the first array. The control circuitry can be coupled to and biasing the first and second arrays to impart a plurality of phase modulations to the individually-addressed pixels and to impart a plurality of phase modulations to the individually-addressed pixels and to impart an M number of phase modulations to the border pixels. M is a number of electrically-connected groups of pixels in the second array. A different phase modulation can be imparted to each of the groups.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1:
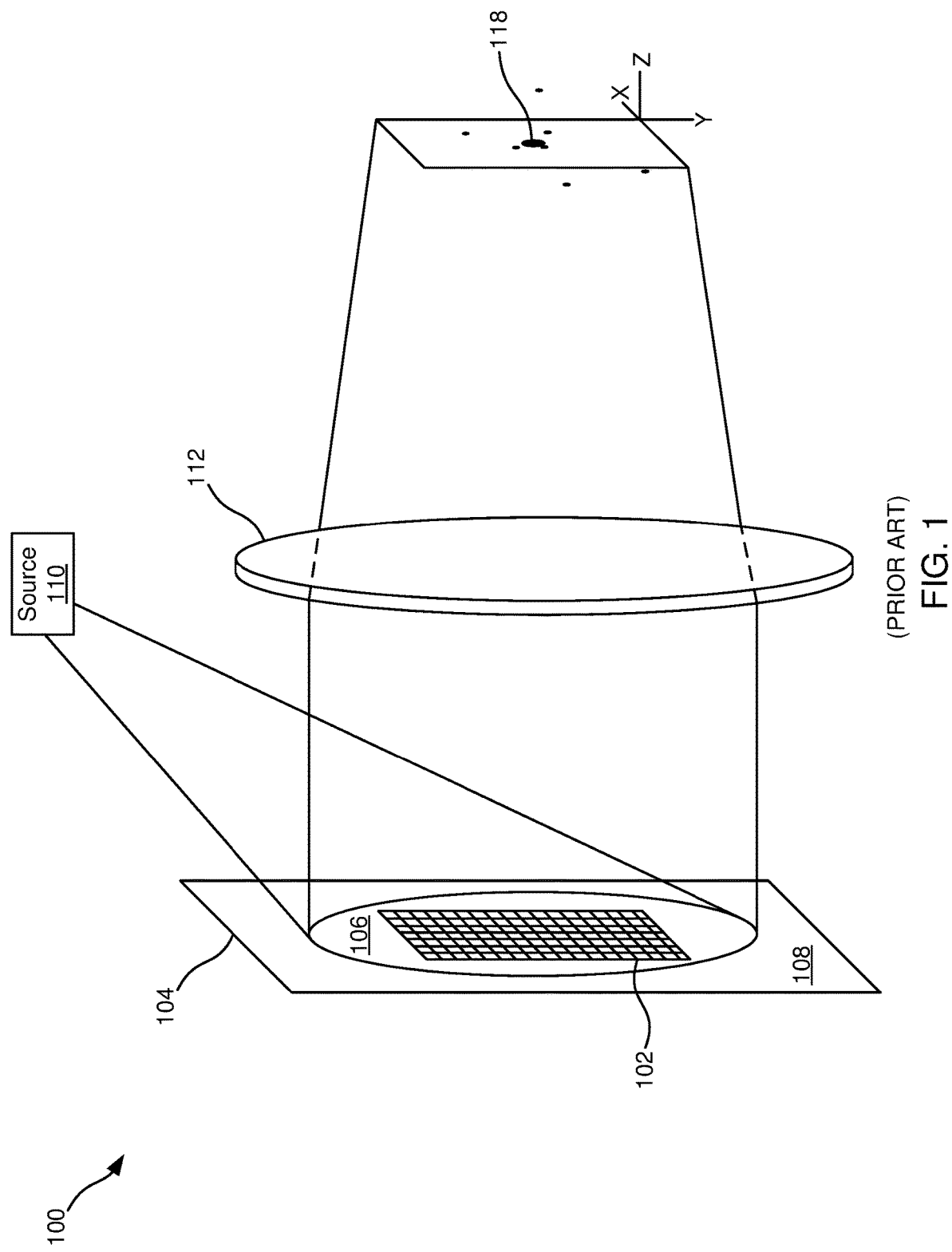
FIG. 1 illustrates a spatial light modulator system where light from a source is reflected off active pixels as well as a substrate of a spatial light modulator.
Figure 2:
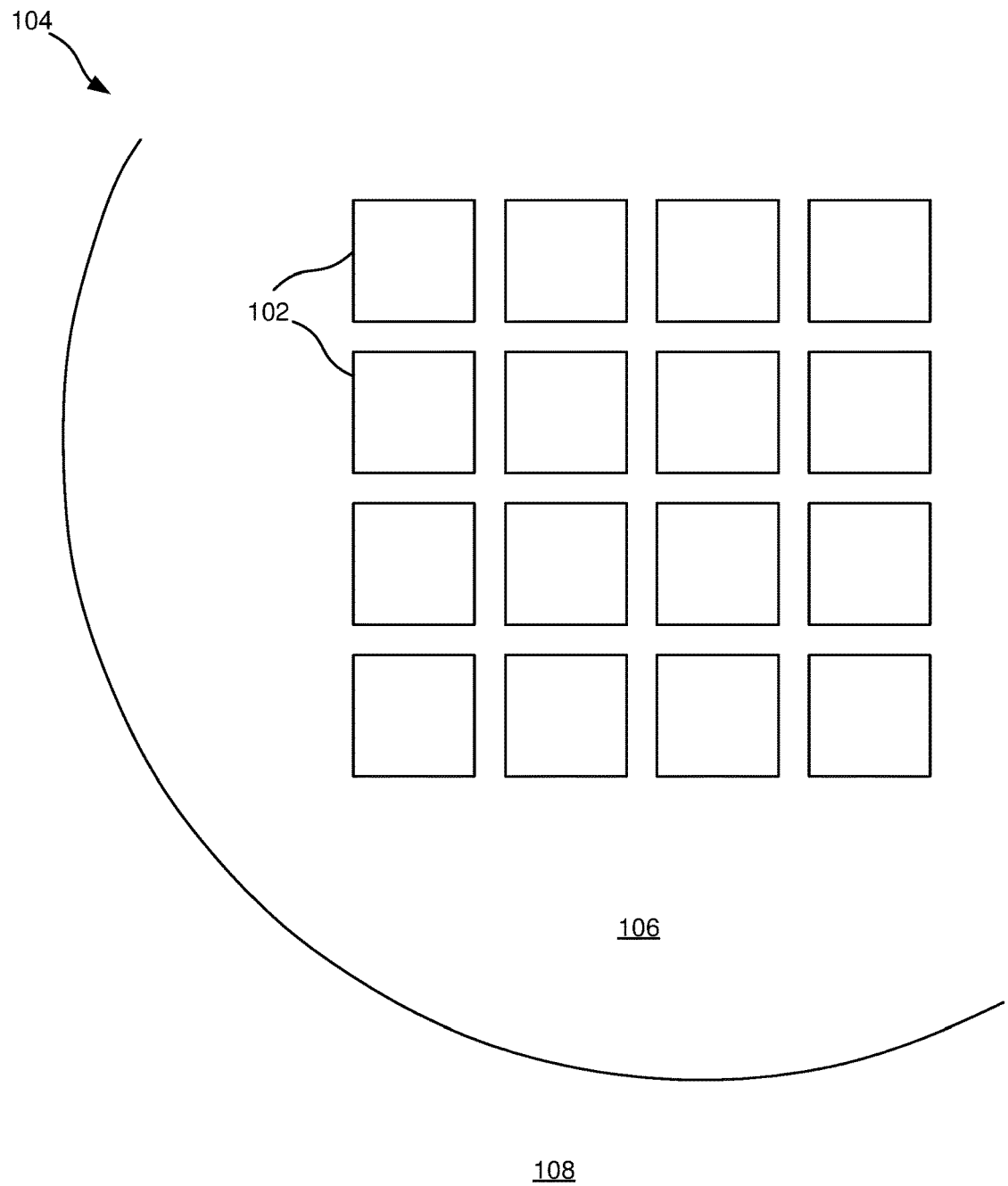
FIG. 2 illustrates a detailed view of the SLM of FIG. 1 showing the light beam extending beyond an edge of the active array of pixels.
Figure 3:
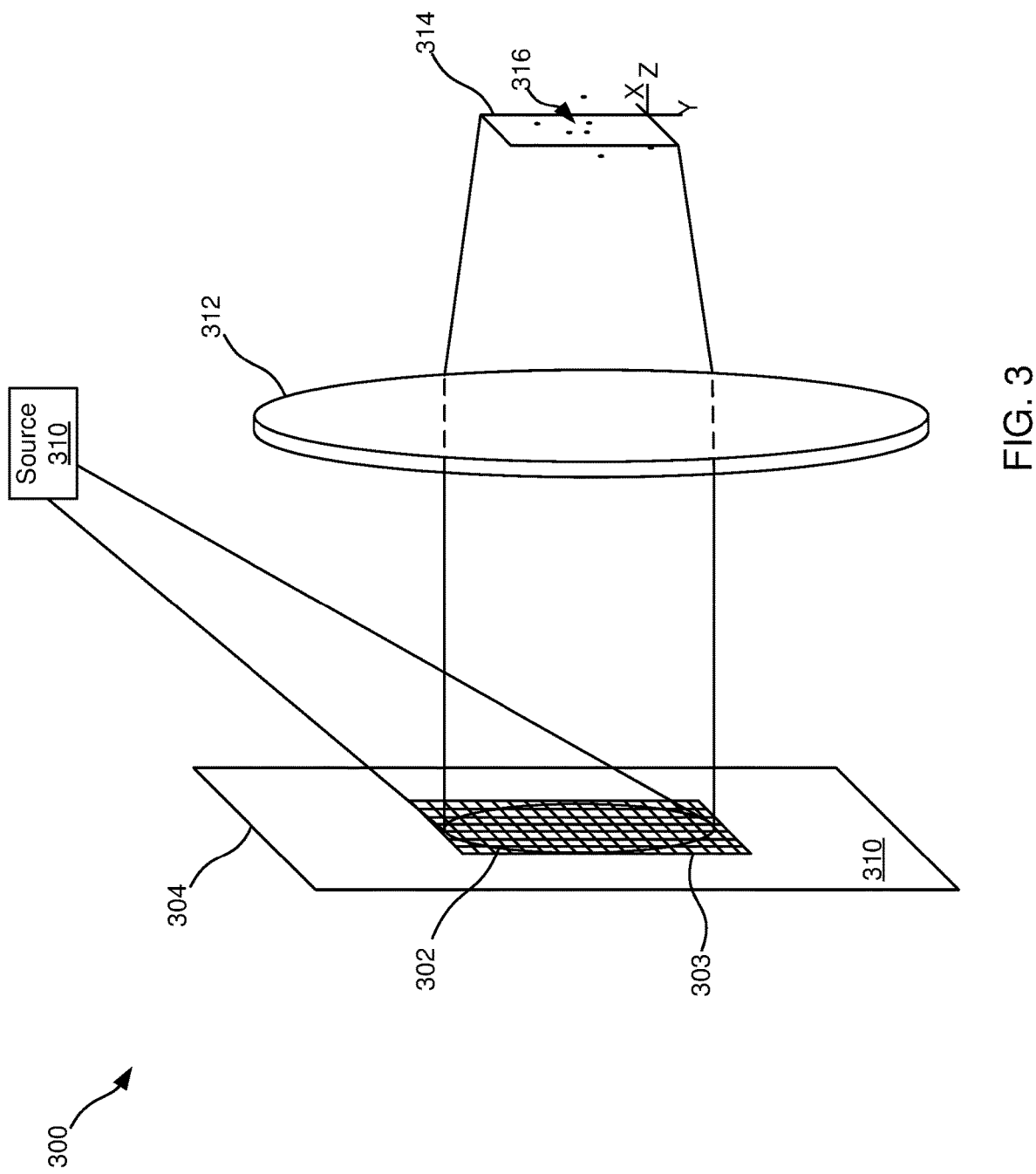
FIG. 3 illustrates a spatial light modulator system that is under-filled.
Figure 4:
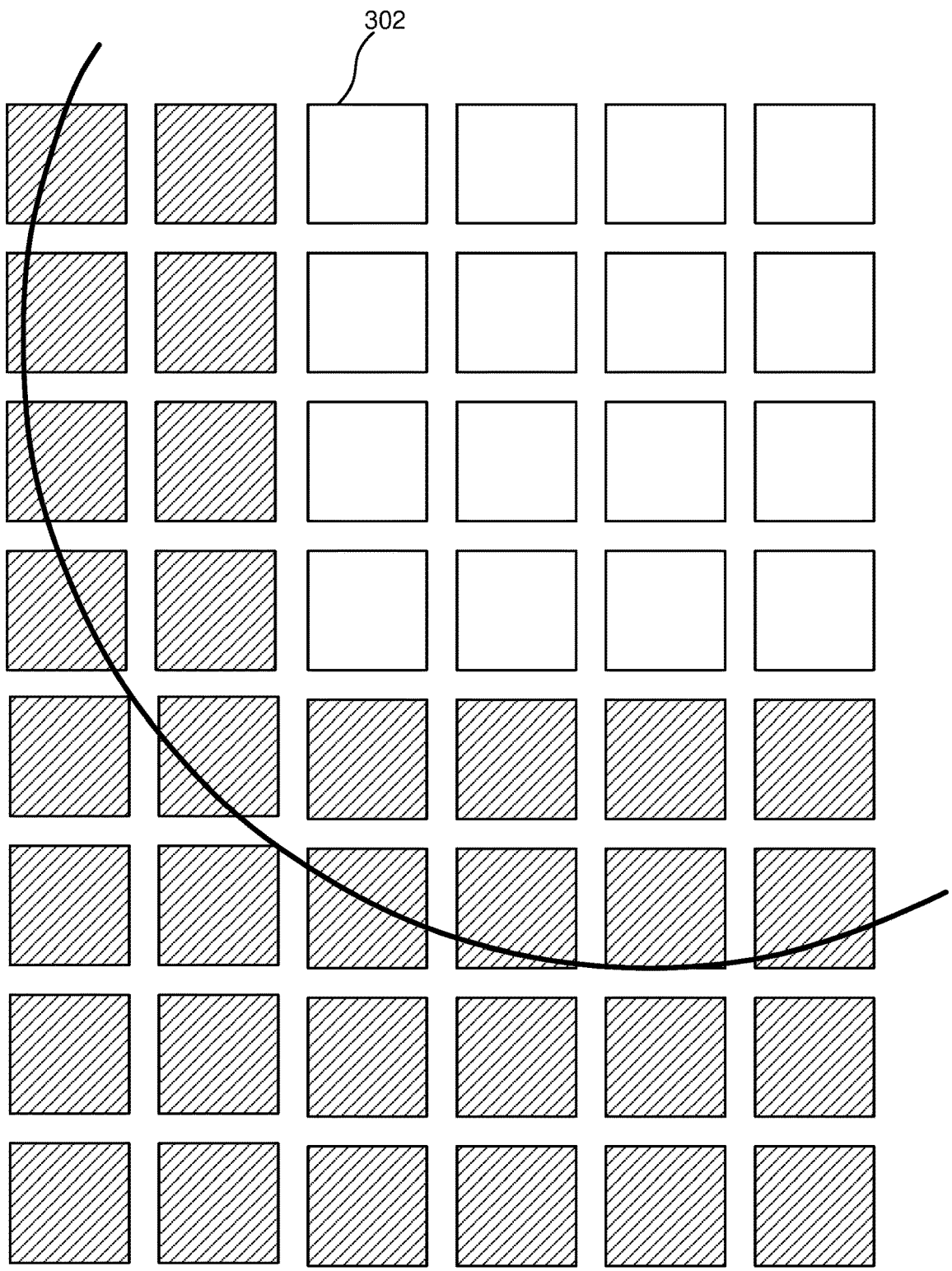
FIG. 4 illustrates a detailed view of the SLM of FIG. 3 showing the light beam under-filling the pixel array.

The present application relates to optical phase modulation. More specifically, but without limitation, the present disclosure relates to individually-addressed reflective phase modulation pixels and group-addressed pixels of an SLM (or "border pixels"), where the group-addressed pixels have a higher spatial frequency than that of the individually-address pixels.

The word "exemplary" is used herein to mean "serving as an example, instance, or illustration." Any embodiment described herein as "exemplary" is not necessarily to be construed as preferred or advantageous over other embodiments.

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

One type of spatial light modulator that can readily incorporate this invention is the Liquid Crystal On Silicon SLM. These devices typically use the metallization layers deposited in an integrated circuit manufacturing process for interconnect wiring within the device, and also as a combined mirror/electrode layer that is used for reflecting light and controlling a liquid crystal layer. Sometimes there are variations, such as the incorporation of a dielectric reflector or the use of non-standard processing for the mirror/electrode metal layer, but generally the array of pixels is defined by the patterning of that metal layer. The pixels are individually addressable, which is what gives them their utility in the optical system.

In one embodiment, this disclosure uses the same patterning techniques that are used to define the active pixels, but a mirror/electrode pattern of a higher spatial frequency than the active pixel array is defined outside the active pixel array.

Figure 7:
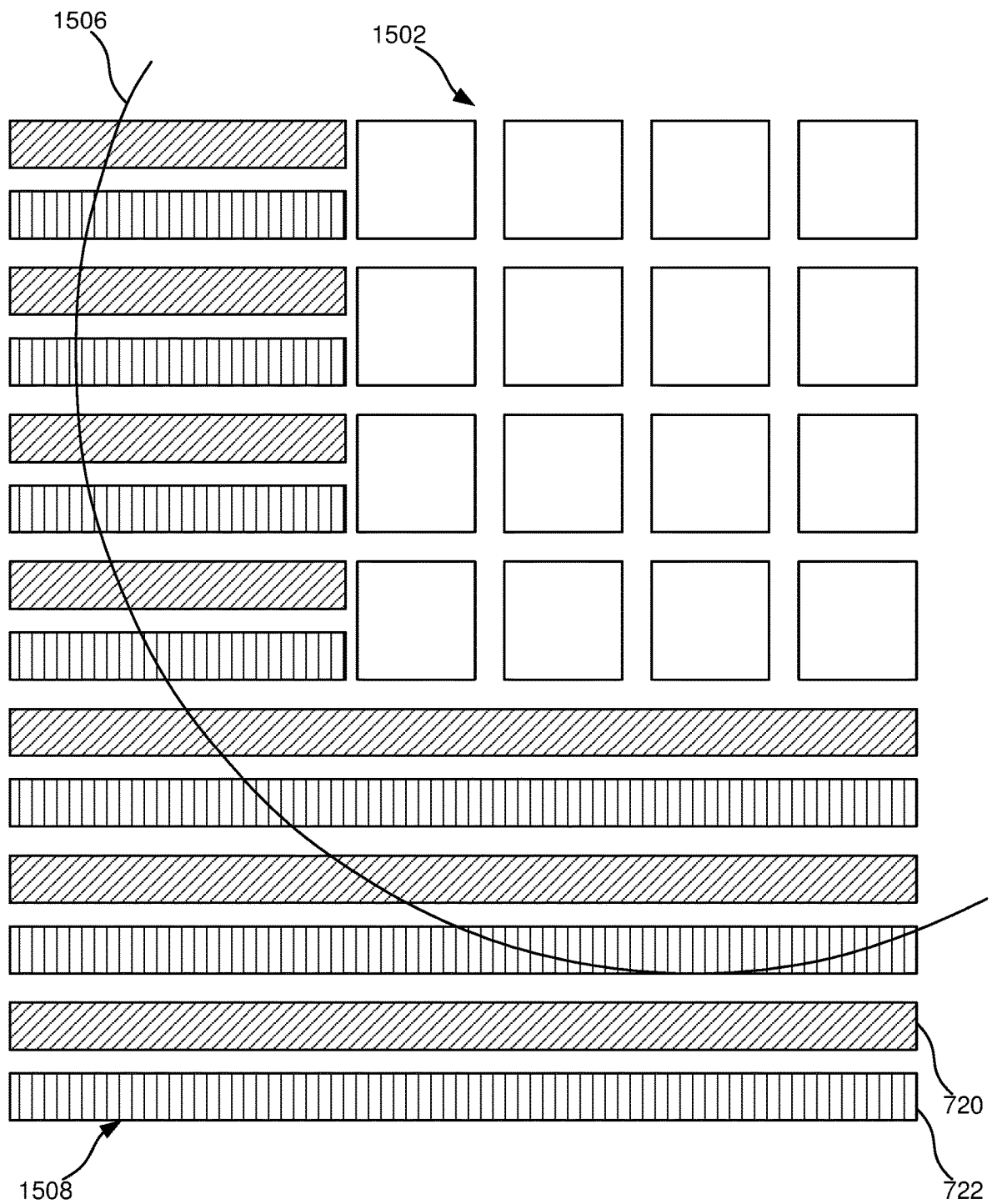
FIG. 7 illustrates a detailed view of another pattern for the group-addressed pixel array of FIG. 5.
Figure 15:
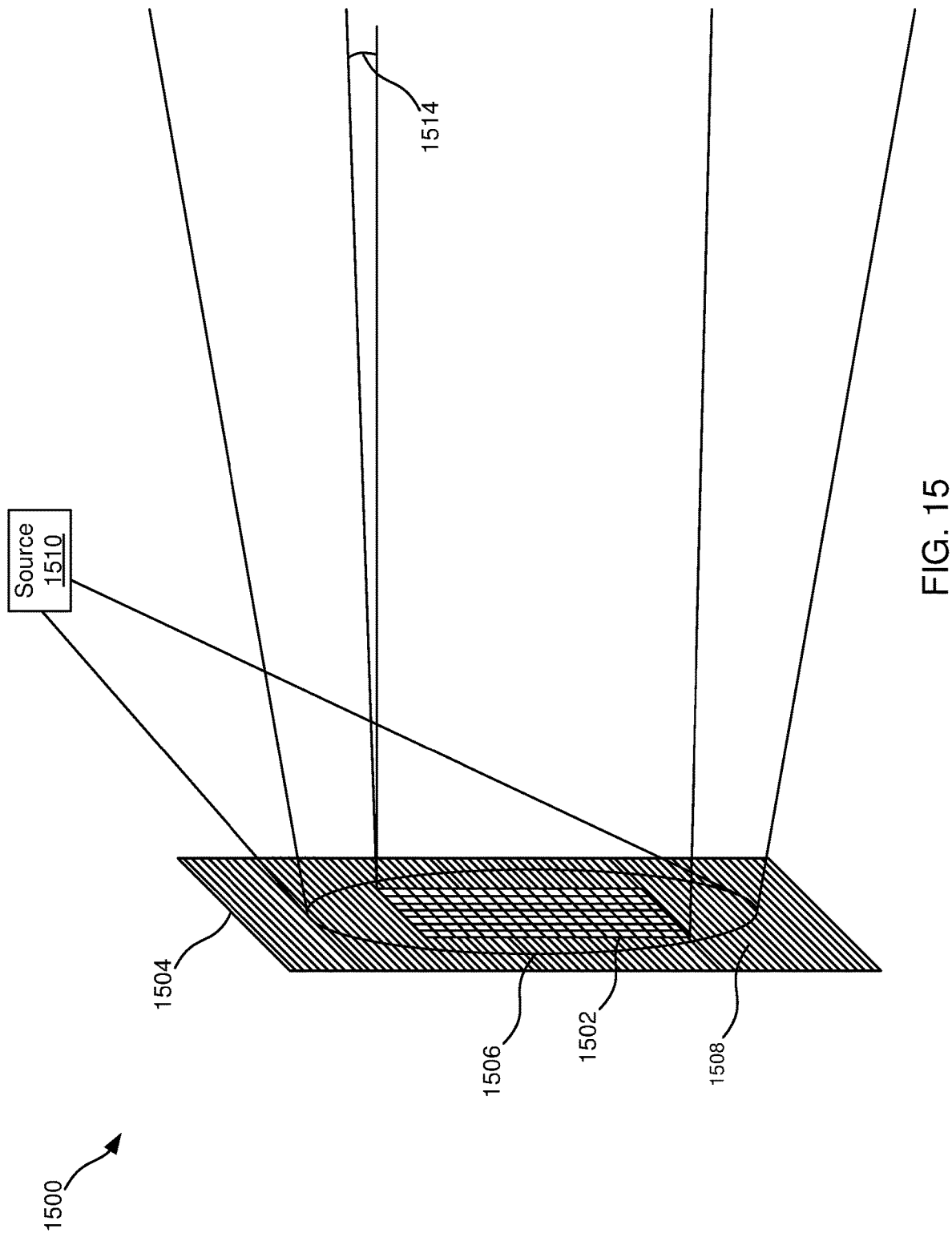
FIG. 15 illustrates a spatial light modulator with an individually-addressed pixel array surrounded by a group-addressed pixel array having a higher spatial frequency than the individually-addressed pixel array.

FIGS. 15 and 7 illustrates an SLM with an individually-addressed pixel array surrounded by a group-addressed pixel array having a higher spatial frequency than the individually-addressed pixel array. In particular, SLM 1504 can include an individually-addressed pixel array 1502 having a rectangular shape (although square, hexagonal, and other shaped arrays are also envisioned). Outside the individually-addressed pixel array 1502 can be a peripheral area comprising a group-addressed array of pixels 1508 or electrodes. As shown, the group-addressed array of pixels 1508 extends to an edge of the SLM 1504, but this is not required. In some embodiments, the group-addressed array of pixels 1508 or electrodes may extend to a border between the beam and the edges of the SLM 1504. In some cases, the beam may even spill over the edge of the group-addressed array of pixels 1508, depending on how the edge 1506 of the beam is defined.

The group-addressed array of pixels 1508 can take a variety of forms including rows (e.g., FIG. 8), columns (e.g., FIG. 8), checkerboard patterns (e.g., FIG. 6), etc. The group-addressed array of pixels 1508 can be formed from mirrors and/or electrodes that can be controlled or biased in a manner that causes a portion of the reflected light to be steered outside of a target range of angles (e.g., 0' to the maximum target angle 1514). In other words, the individually-addressed pixel array 1502 is biased or controlled to produce light that reflects at an angle that is less than or equal to a maximum target angle 1514. This range of target angles or maximum target angle 1514 is referenced relative to the SLM 1504 in FIG. 15. However, in embodiments, where reflected light passes through a lens or lenses, the target range of angles can refer to an output from the lens or lenses.

In order for the group-addressed array of pixels 1508 to redirect a portion of the beam outside of the target range of angels, the group-addressed array of pixels 1508 can have a spatial frequency, N' that is greater than the spatial frequency, N, of the individually-addressed array of pixels 1502. In other words:

$$N'>N$$

Further, optical phase values of the mirrors/electrodes in the group-addressed array of pixels 1508 should alternate between values that are approximately a half wave (7t radians) apart. While a separation of π radians is preferred, practically achieving such a precise phase separation between mirrors/electrodes in the group-addressed array of pixels 1508 can be challenging. Thus, some variance from this phase separation is allowable depending on the demands of the application. In some embodiments, the mirrors/electrodes in the group-addressed array of pixels 1508 can have alternating phase values, such that adjacent mirrors/electrodes have phase levels that differ by half a wave or a multiple thereof.

In some embodiments, the individually-addressed array of pixels can be between 256×256 and 1536×1536 pixels, and can include any square, rectangular, or other shape within these non-limiting bounds. In some embodiments, the pixels in the individually-addressed array of pixels can be around 20 μm in width and/or length. In some embodiments, the individually-addressed pixel array 1502 can have approximately a 300 Hz refresh rate. In other embodiments, the individually-addressed pixel array 1502 may be sized such that the pixels therein can achieve at least a 25 Hz refresh rate, at least a 50 Hz refresh rate, 200 Hz refresh rate, at least a 2 kHz refresh rate, or at least a 6 kHz refresh rate.

The maximum target angle 1514 can be defined as the angle of reflected light when the active pixels in the SLM 1504 are driven to a highest spatial frequency pattern. In one dimension, this pattern is an alternating "high", "low" phase pattern. The maximum diffraction efficiency into first-order spots may be achieved when the high and low phase values differ by π. In this case, there is a theoretical maximum of approximately 40% of the light diffracted into each of the +/–first order beams, and the rest of the light is lost to higher orders.

It is generally considered that the useful range of angles is defined by these beam directions, with the higher-order beams containing no useful information representative of the pattern written to the individually-addressed pixel array. For this reason, many optical systems will block the higher order light with an aperture, or otherwise ignore this wasted light. For the purposes of this disclosure, higher order light is considered negligible and thus not discussed or considered.

Assuming illumination at normal incidence, the size of the maximum target angle, Omax (e.g., 1514 in FIG. 15) is given by $$\sin(\theta_{max})=\lambda/2d$$

Where λ is the wavelength of the incident light, and d is the pixel pitch. This relationship is valid for both axes, and so an SLM with pixels disposed on a square array will be able to address a square in angle space.

If the border pixels are arranged to be addressable with a higher spatial frequency than the individually-addressed pixels, then, in theory, all the light that is incident on the border pixels may be diffracted "outside", or to higher angle, than the target range of angles. However, in practice, some light reflected from the border pixels may leak into the target range of pixels (e.g., if there are imperfections in the border pixels, such as if the phase levels imprinted on the light by the border pixels are not ideal, or if there is inter-pixel leakage).

Figure 5:
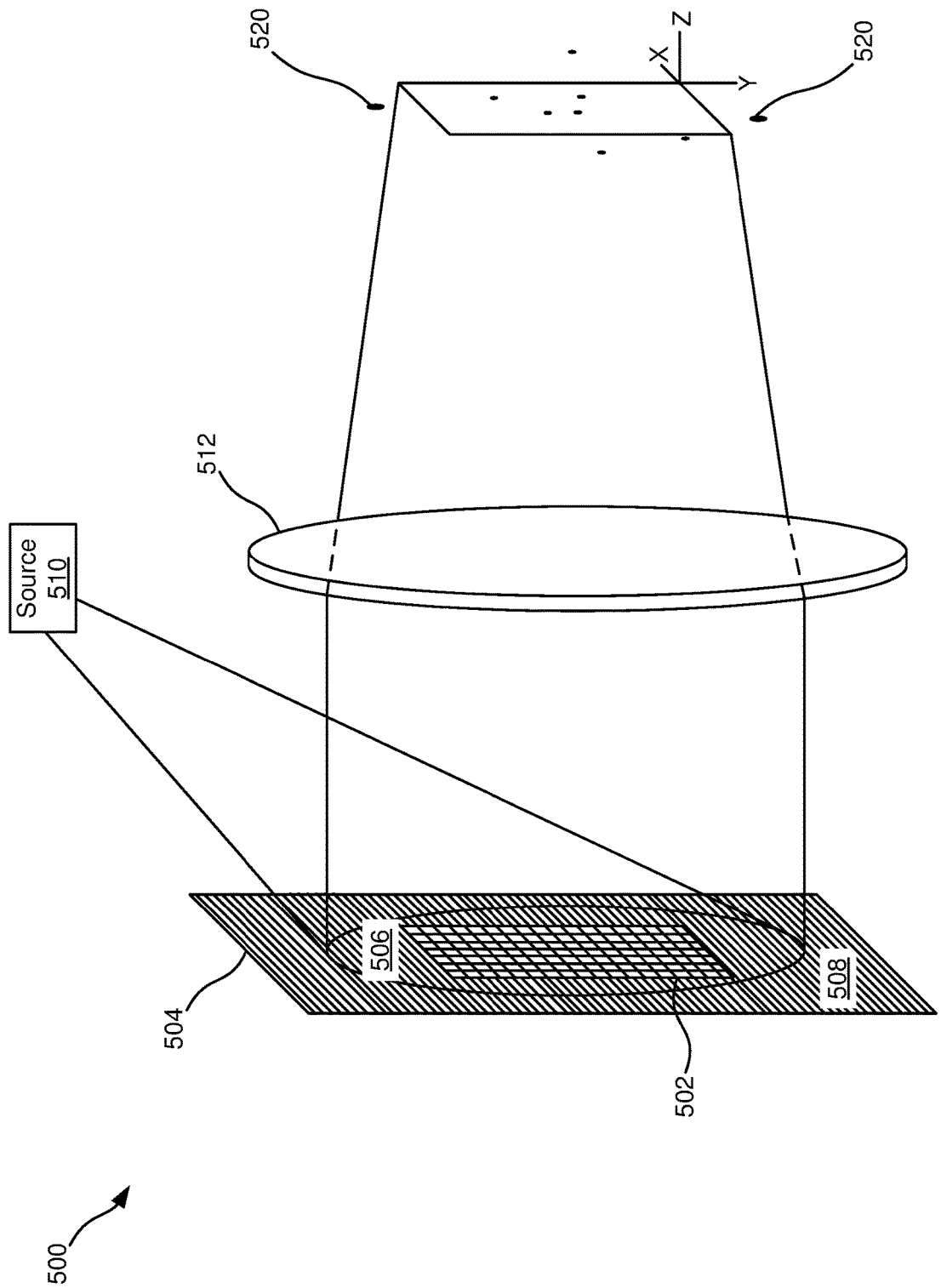
FIG. 5 illustrates a spatial light modulator with an individually-addressed pixel array surrounded by a group-addressed pixel array having a higher spatial frequency than the individually-addressed pixel array.

While FIG. 15 illustrates a generalized application where reflections from the individually-addressed array of pixels 1502 are directed into a target range of angles, other embodiments may look to focus spots within a three-dimensional volume (e.g., Fourier holography). FIG. 5 illustrates one example of a Fourier holography application. Here, the SLM 504 reflects a first portion of light from a source 510 toward one or more lenses, such as lens 512, and the one or more lenses can focus the light within a target volume. Group-addressed pixel array 508 can reflect a second portion of the beam through the one or more lenses, and possibly partially outside the one or more lenses, to paths that are outside the target volume. In particular, this second portion of light may be focused to one or more bright spots 520 that are exterior to the target volume. Thus, unlike prior art techniques that may form a zero-order bright spot at a center of the target volume, the system 500 of FIG. 5 directs the unwanted light to bright spots outside the target volume by using a group-addressed pixel array that has a higher spatial frequency than the spatial frequency of the individually-addressed array of pixels 1502.

In other embodiments, the light may reflect off the SLM 504 multiple times before reaching a target. For instance, a series of lenses and mirrors may be used in combination with the SLM 504.

Figure 6:
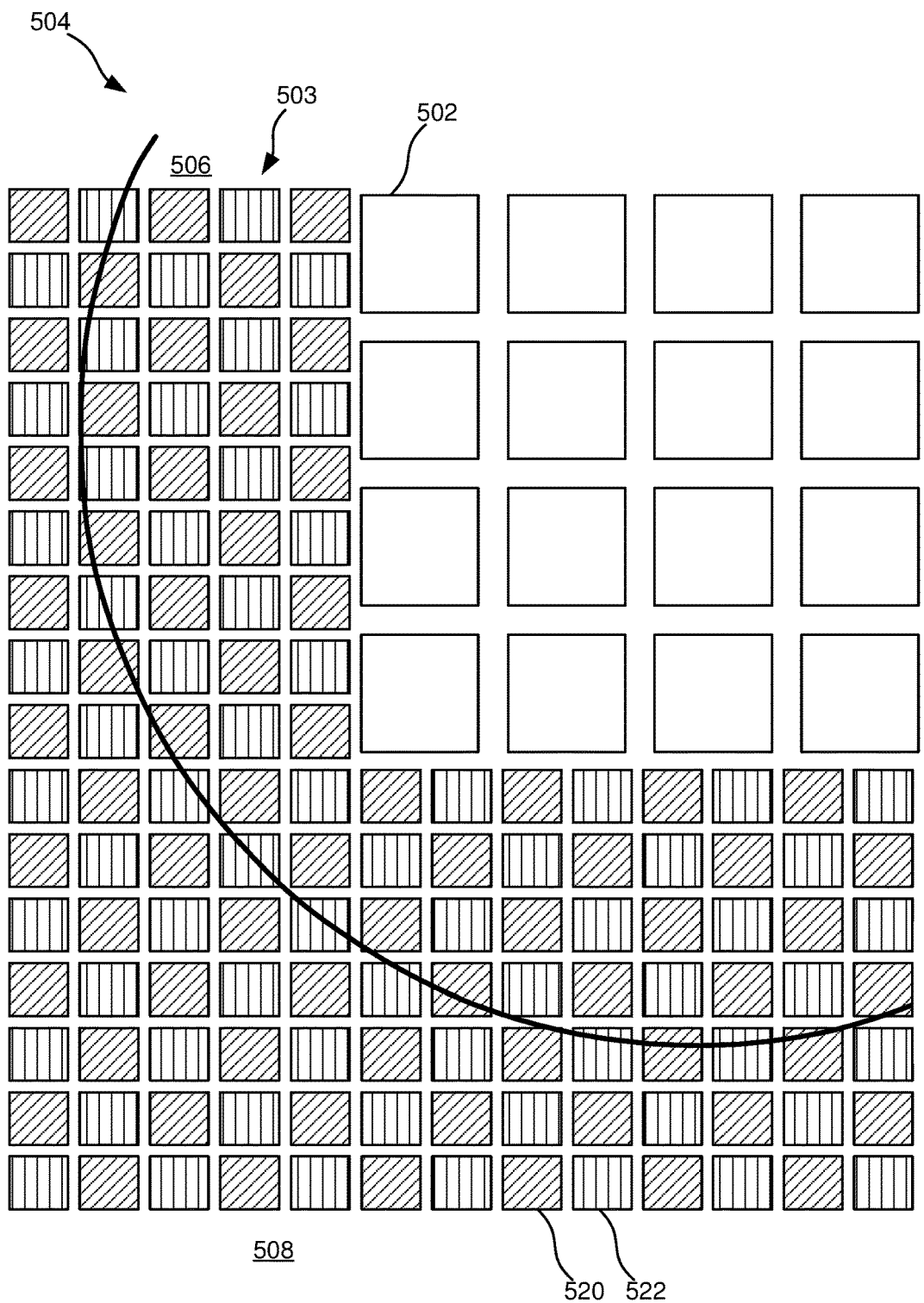
FIG. 6 illustrates a detailed view of one pattern for the group-addressed pixel array of FIG. 5.
Figure 8:
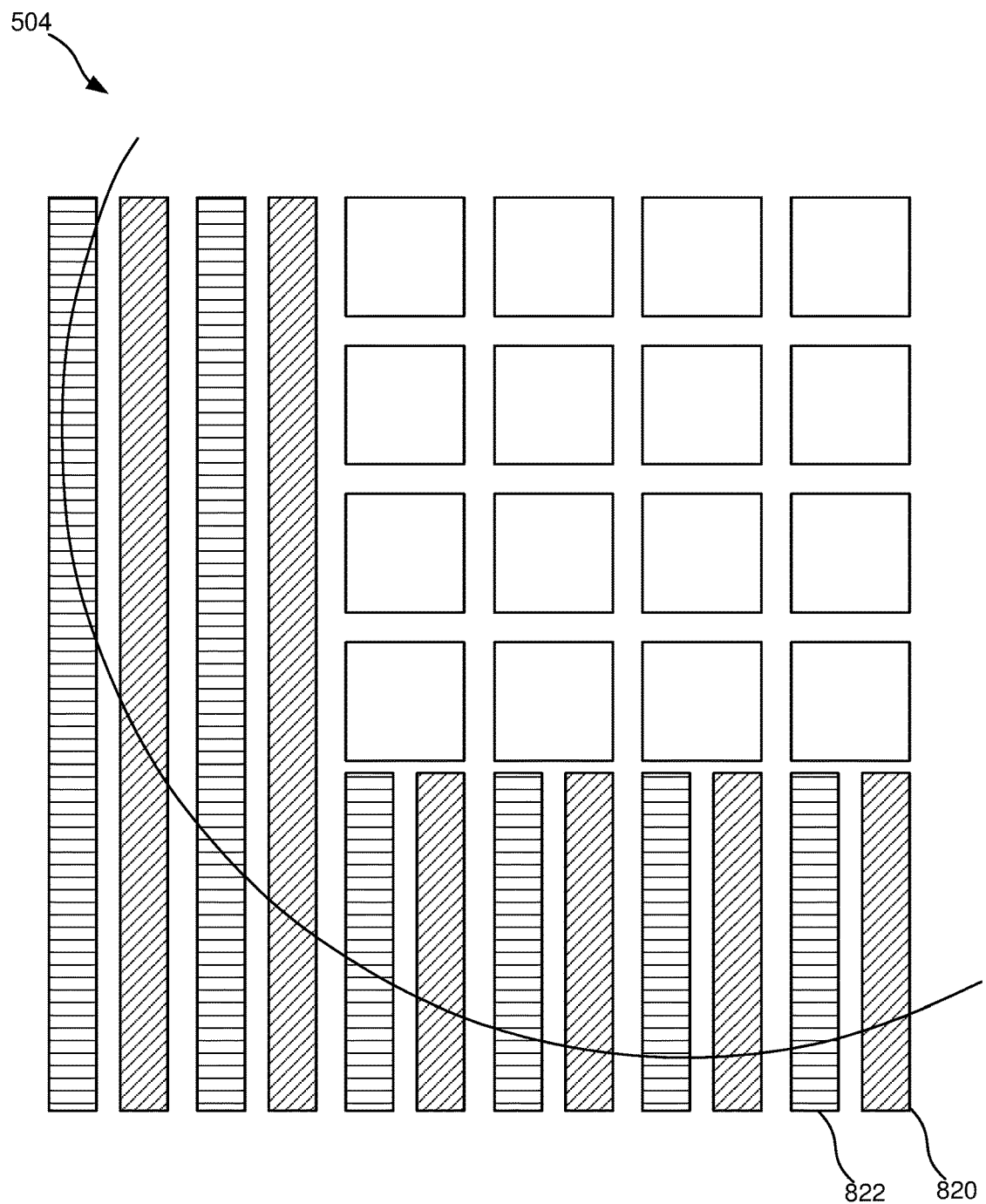
FIG. 8 illustrates a detailed view of yet another pattern for the group-addressed pixel array of FIG. 5.
Figure 9:
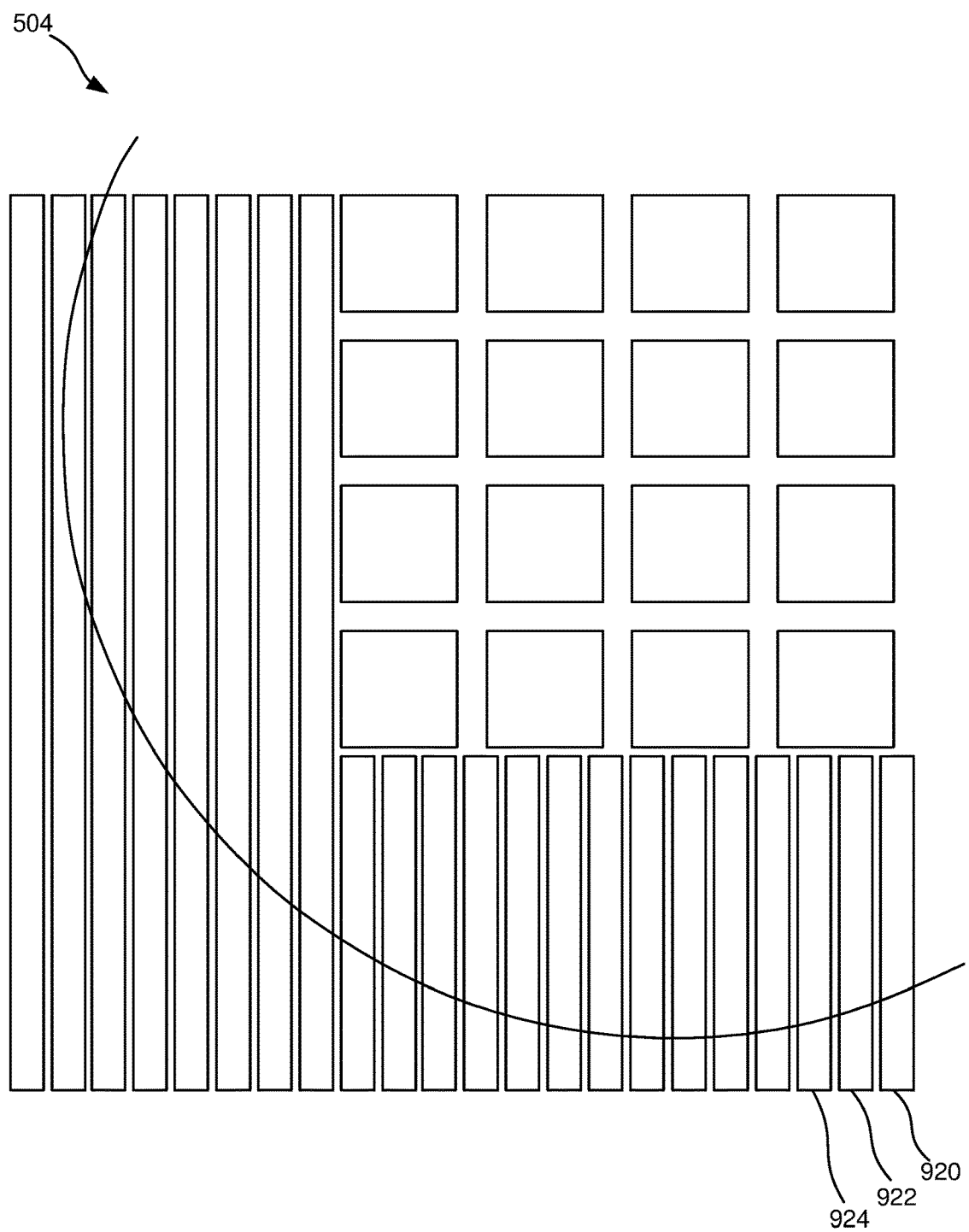
FIG. 9 illustrates a detailed view of yet another pattern for the group-addressed pixel array of FIG. 5.

FIGS. 6-8 illustrate embodiments of group-addressed pixel arrays having a higher spatial frequency than the individually-addressed array of pixels. For instance, the relationship of N' over N for these examples may be around 2. However, N' can be two or more times N. For instance, in FIG. 9 we see an example where N'/N is a little over 3.

Where the group-addressed array of pixels is formed from biased electrodes, biasing may be on device or off device. In other words, the SLM can include biasing devices on the SLM or contact pads that can provide biasing currents and/or voltages from off-device power sources.

In some embodiments, all pixels in the group-addressed array of pixels can be biased via the same polarity of AC signal, but the varying optical phases for each group of electrodes can be effected via different AC amplitudes.

Figure 10:
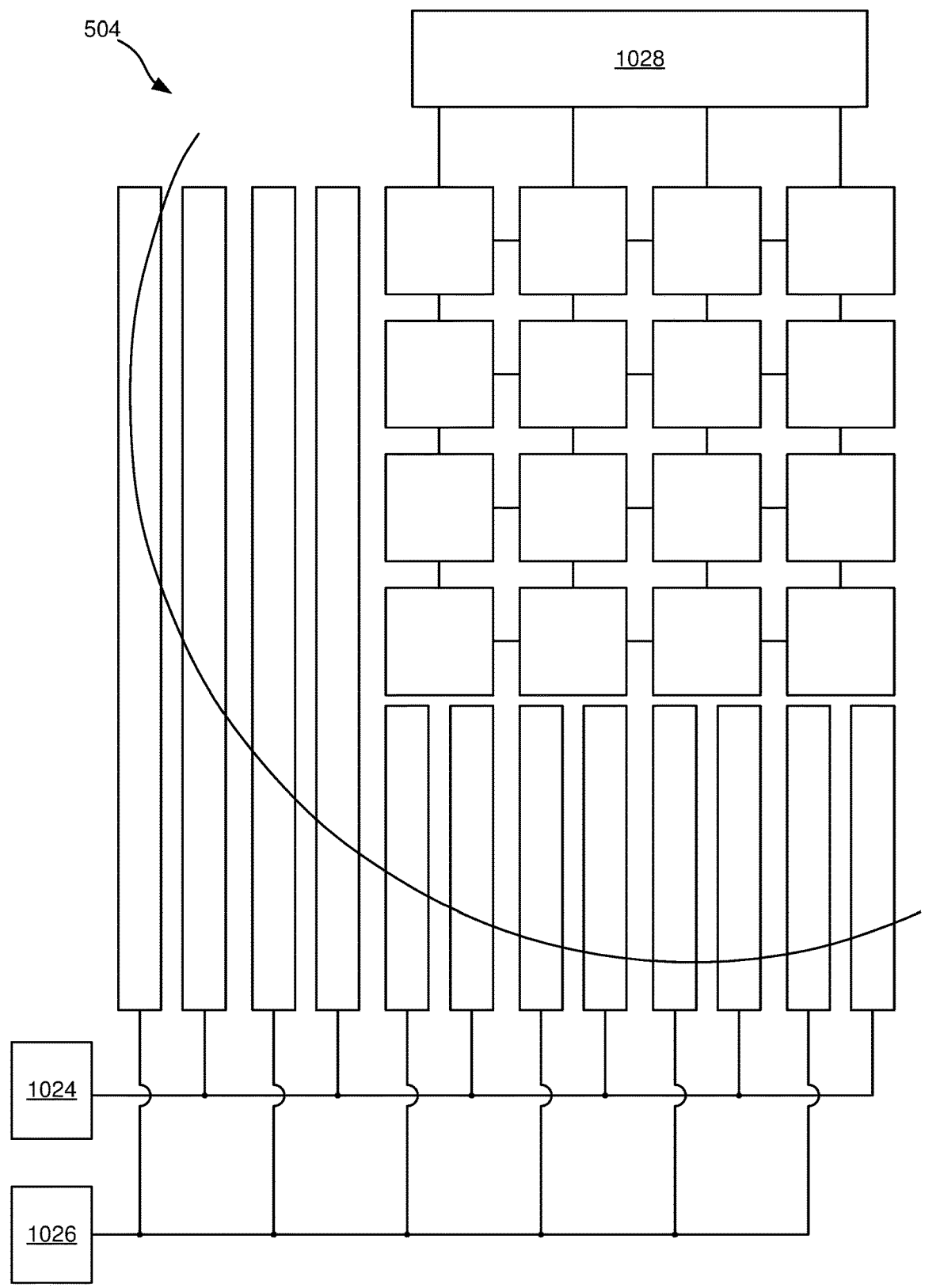
FIG. 10 illustrates a detailed view of biasing circuits for an embodiment of the individually-addressed and group-addressed pixel arrays for the SLM of FIG. 5.

FIG. 10 illustrates an embodiment of an SLM where individually-addressed pixels are biased via individually-addressed pixel biasing device 1028 and the group-addressed pixels are biased via group-addressed pixel biasing devices 1024, 1026. The individually-addressed pixel biasing device 1028 can individually address each pixel within the individually-addressed pixel array. The group-addressed pixel biasing devices 1024, 1026 each are coupled to and bias some portion of the electrodes in the group-addressed pixel array. In this example, each of the group-addressed pixel biasing devices 1024, 1026 bias alternating vertical electrodes. The biasing of the group-addressed pixel biasing devices 1024, 1026 is such that there are two groups of electrodes (e.g., alternating electrodes) that when biased, effect a phase delay to reflecting light that differs B*π (where B is any odd integer) between the two groups. For instance, in the illustrated example, adjacent electrodes produce a phase delay that differs from the two adjacent electrodes by B*π.

Figure 11:
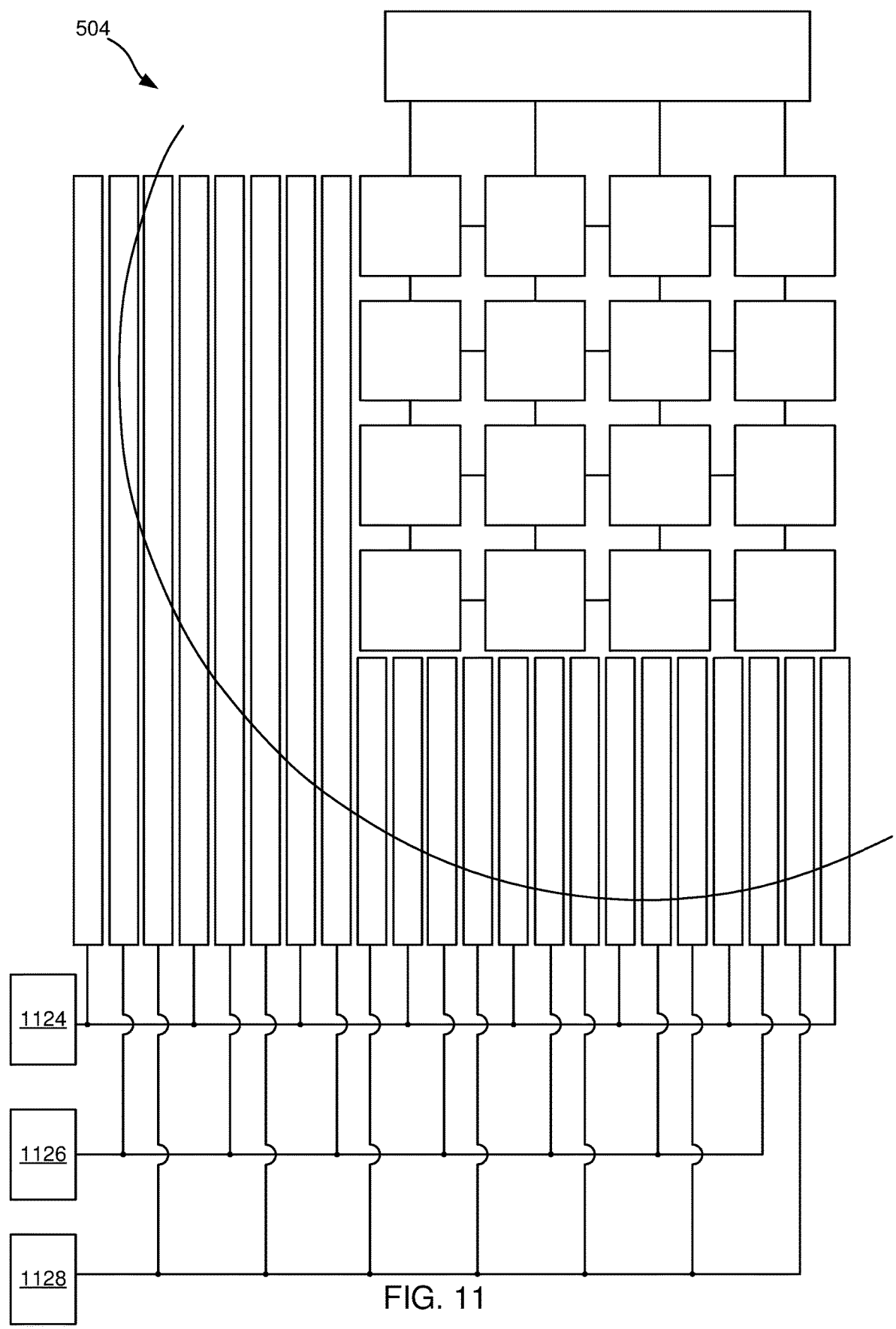
FIG. 11 illustrates a detailed view of biasing circuits for another embodiment of the individually-addressed and group-addressed pixel arrays for the SLM of FIG. 5.

FIG. 11 illustrates an example of a group-addressed array of pixels having three groups of electrodes (more than three are also possible). The individually-addressed array is again individually addressable and each of the three groups of electrodes have a distinct bias provided by respective group-addressed pixel biasing devices 1124, 1126, 1128. The three groups of electrodes could be driven to phase values separated from adjacent neighboring electrodes by one third of a wave of phase. The group-addressed biasing can approximate a blazed grating, which could allow the energy incident on the group-addressed array of pixels be directed predominately in one direction (i.e., outside the target range of angles).

More generally, as long as a spatial frequency analysis of the pattern for the group-addressed pixel array does not show any components of a lower spatial frequency than a highest spatial frequency that can be represented by data written to the individually-addressed pixel array, any pattern and spacing can be used with the group-addressed pixel array. The embodiment of N'>N and the phase difference between two groups of electrodes/mirrors in the group-addressed pixel array, is just one practical way to achieve this more general rule.

These same descriptions would apply to design of group-addressed arrays of pixels formed from mirrors, except that the phase delays could be set during mirror fabrication rather than via electrical biasing.

Figure 12:
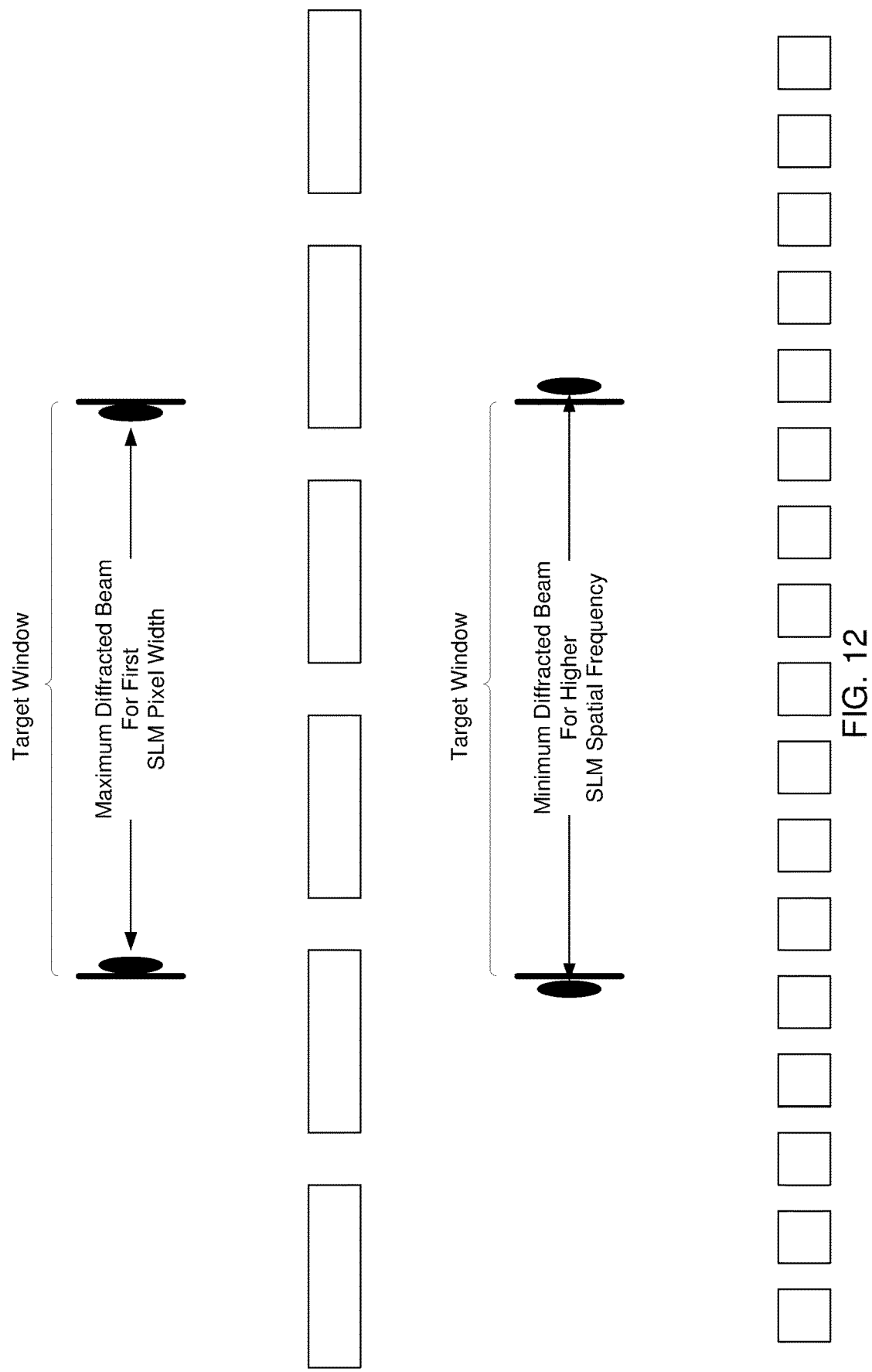
FIG. 12 illustrates two examples of a relation between pixel spatial frequency and diffracted beam angles.

FIG. 12 illustrates two examples of a relation between pixel spatial frequency and diffracted beam angles. The spatial frequency in the top figure is lower than that in the bottom. In other words, the top figure can represent a spatial frequency of individually-addressed pixels, while the bottom figure can represent a spatial frequency of group-addressed pixels. In both figures there is a target window (e.g., target range of angles). The top figure shows that the lower spatial frequency results in a maximum diffracted beam that correspond to the target window (i.e., this pixel spacing enables individual biasing of the pixels to reflect light anywhere within the target window). The bottom figure shows that the higher spatial frequency results in a minimum diffracted beam that corresponds to the target window (i.e., this pixel spacing prevents reflected light from these pixels from falling within the target window). Said another way, by properly selecting the spacing of pixels in the individually-addressed and group-addressed arrays, an SLM can be designed that causes light incident outside the individually-addressed array of pixels to be reflected primarily (e.g., over 50% of this light) outside of the target window.

Figure 13:
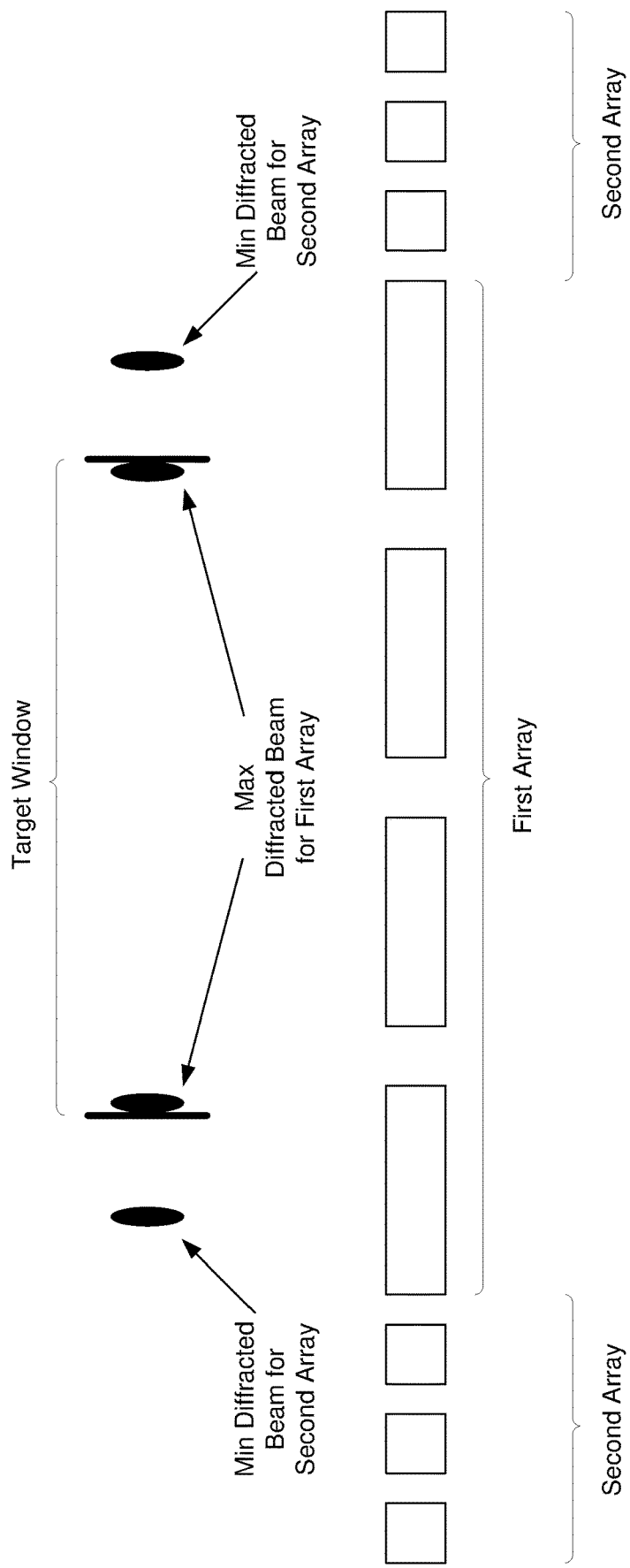
FIG. 13 illustrates an example of both pixel pitches describes in FIG. 12 being used in combination.

FIG. 13 illustrates an example of both pixel pitches describes in FIG. 12 being used in combination. The first array can be individually-addressed, while the second array can be group biased.

Figure 14:
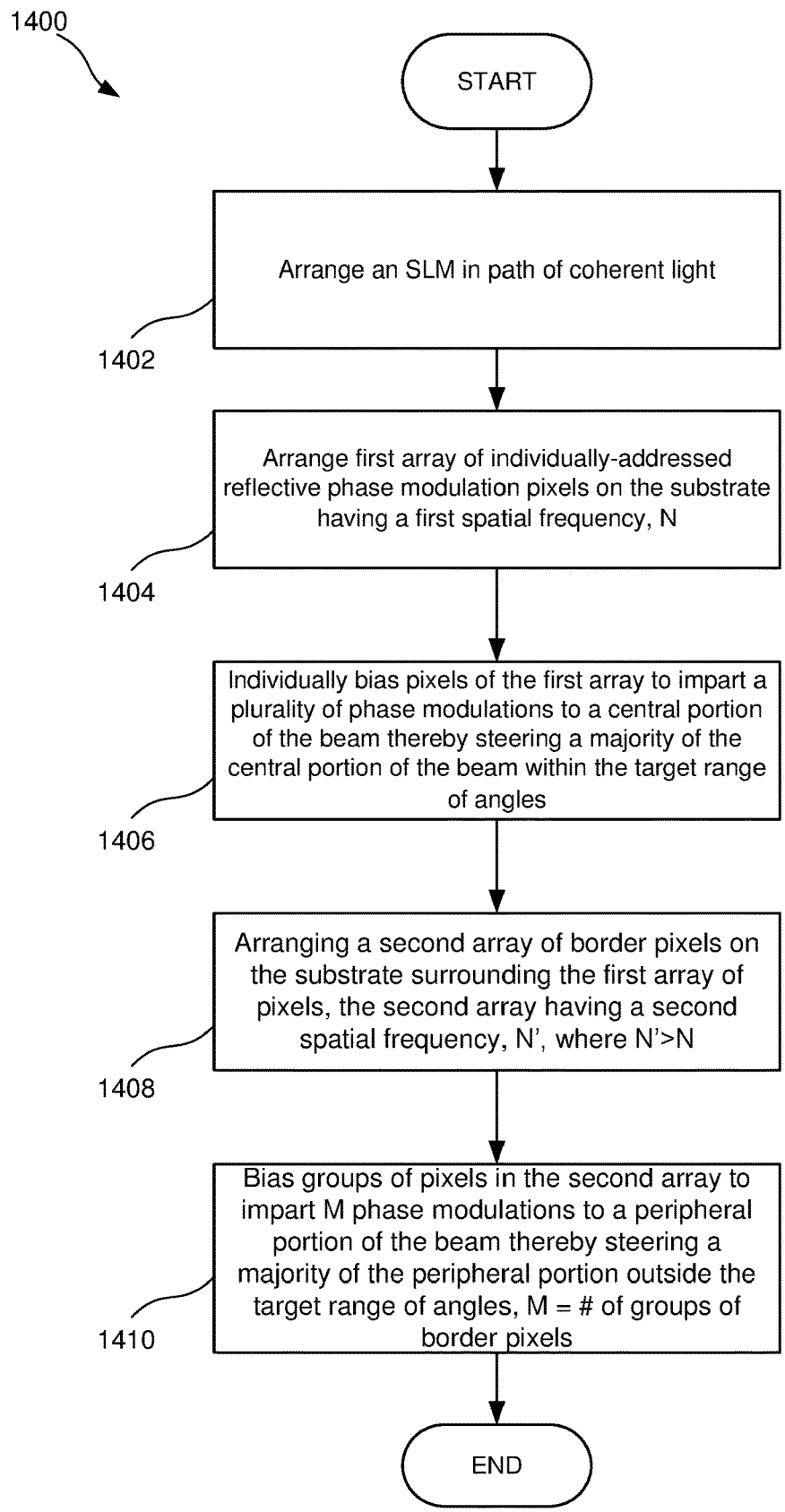
FIG. 14 illustrates a method of steering reflected light according to one embodiment of this disclosure.

FIG. 14 illustrates a method of steering reflected light using individually-addressed pixels and group-addressed pixels. The method can include arranging an SLM in a path of a coherent beam of light (Block 1402). The SLM can include a substrate. The method may further include arranging a first array of individually-addressed reflective phase modulation pixels on the substrate having a first spatial frequency of N (Block 1404). The method may further include individually biasing pixels of the first array to impart a plurality of phase modulations to a central portion of the beam (Block 1406). The method may further include arranging a second array of border pixels on the substrate surrounding the first array of pixels, the second array of border pixels having a second spatial frequency of N', where N'>N (Block 1408). The method may yet further include biasing groups of pixels in the second array of border pixels to impart M phase modulations to a peripheral portion of the beam, where M is a number of different groups of pixels in the second array of border pixels (Block 1410).

The foregoing is illustrative of the present disclosure and is not to be construed as limiting thereof. Although a few exemplary embodiments of this invention have been described, those skilled in the art will readily appreciate that many modifications are possible in the exemplary embodiments without materially departing from the novel teachings and advantages of this disclosure. For example, the high spatial frequency border pixels need not be a simple multiple of the individually-addressed array's spatial frequency, and the edges of some of the peripheral pixels need not be aligned with the individually-addressed pixels. In another example, the pattern of the peripheral pixels could be stripes that are angled with respect to an edge of the individually-addressed array, or the pattern of peripheral pixels could contain components of high spatial frequencies in more than one direction such as a fine checker-board, or a hexagon pattern. Note also that the disclosure can be implemented in either transmissive or reflective SLMs. While it may be easier to block peripheral illumination in a transmissive device, it may not be desirable to do so in the case of high-power systems. For these systems, it may be preferable to diffract the "overfill" light to a safe beam dump somewhere else in the system rather than have the energy blocked by the SLM itself. The individually-addressed pixels can also take a square, hexagonal, or other shape as compared to the rectangular individually-addressed arrays discussed above. Another example is an SLM in which the peripheral area is broken up into several "zones". Due to normal construction variations, these zones may demand somewhat different driving signals to produce the desired modulation. This may be accomplished by wiring them to more input connectors. Note also that the signals for driving the peripheral electrodes may be generated on the device itself using standard electronic techniques.

Accordingly, many different embodiments stem from the above description and the drawings. It will be understood that it would be unduly repetitious and obfuscating to literally describe and illustrate every combination and sub-combination of these embodiments. As such, the present specification, including the drawings, shall be construed to constitute a complete written description of all combinations and sub-combinations of the embodiments described herein, and of the manner and process of making and using them, and shall support claims to any such combination or sub-combination.

In the specification, there have been disclosed embodiments of the invention and, although specific terms are employed, they are used in a generic and descriptive sense only and not for purposes of limitation. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

Figure 16:
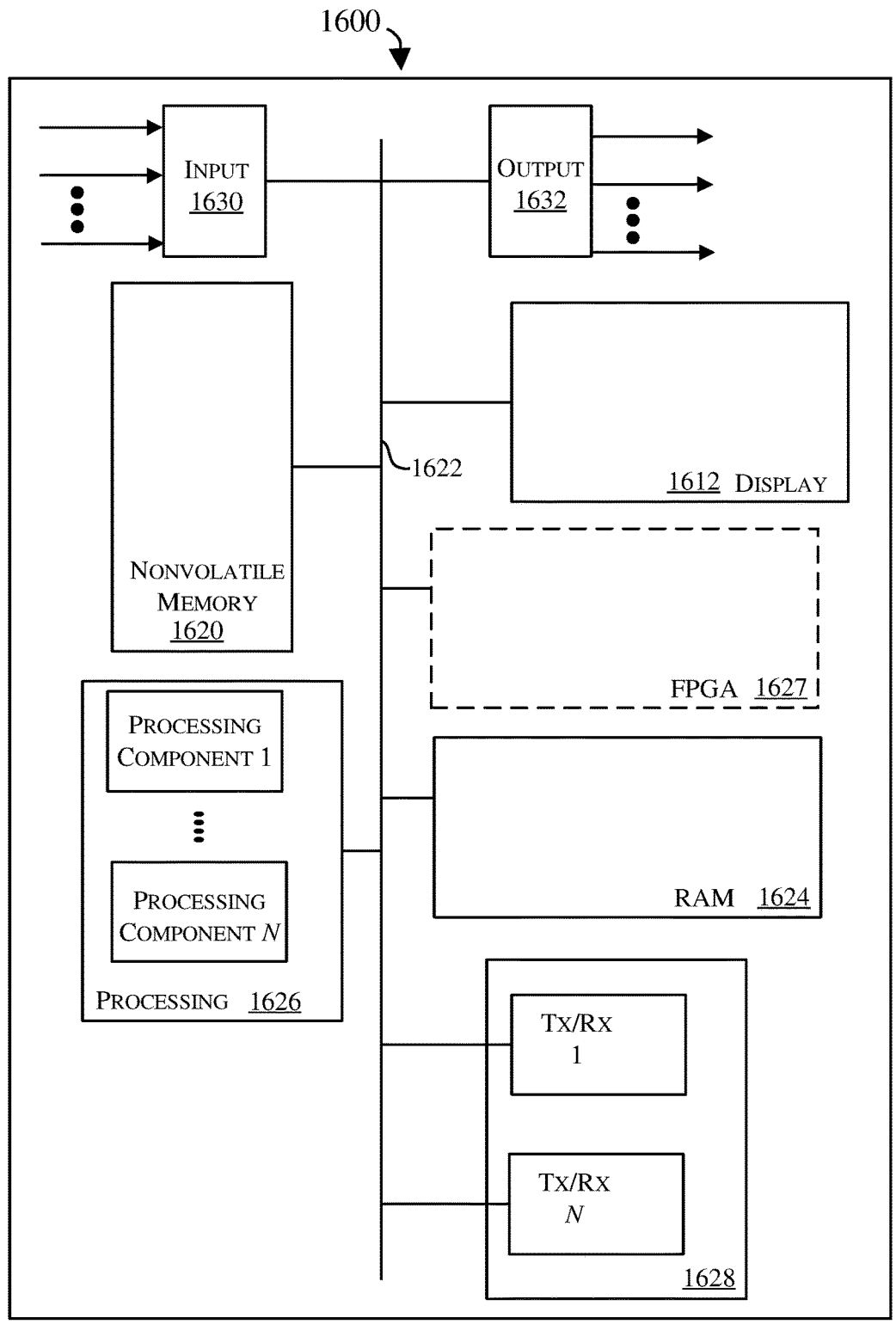
FIG. 16 is a block diagram depicting physical components that may be utilized to realize the herein disclosed SLM's according to an exemplary embodiment.

The methods described in connection with the embodiments disclosed herein may be embodied directly in hardware, in processor-executable code encoded in a non-transitory tangible processor readable storage medium, or in a combination of the two. Referring to FIG. 16 for example, shown is a block diagram depicting physical components that may be utilized to realize the SLM (and the control circuitry for biasing the pixels) according to an exemplary embodiment. As shown, in this embodiment a display portion 1612 and nonvolatile memory 1620 are coupled to a bus 1622 that is also coupled to random access memory ("RAM") 1624, a processing portion (which includes N processing components) 1626, an optional field programmable gate array (FPGA) 1627, and a transceiver component 1628 that includes N transceivers. Although the components depicted in FIG. 16 represent physical components, FIG. 16 is not intended to be a detailed hardware diagram; thus many of the components depicted in FIG. 16 may be realized by common constructs or distributed among additional physical components. Moreover, it is contemplated that other existing and yet-to-be developed physical components and architectures may be utilized to implement the functional components described with reference to FIG. 16.

This display portion 1612 generally operates to provide a user interface for a user, and in several implementations, the display is realized by a touchscreen display. In general, the nonvolatile memory 1620 is non-transitory memory that functions to store (e.g., persistently store) data and processor-executable code (including executable code that is associated with effectuating the methods described herein). In some embodiments for example, the nonvolatile memory 1620 includes bootloader code, operating system code, file system code, and non-transitory processor-executable code to facilitate the execution of a method described with reference to FIG. 14 described further herein.

In many implementations, the nonvolatile memory 1620 is realized by flash memory (e.g., NAND or ONENAND memory), but it is contemplated that other memory types may be utilized as well. Although it may be possible to execute the code from the nonvolatile memory 1620, the executable code in the nonvolatile memory is typically loaded into RAM 1624 and executed by one or more of the N processing components in the processing portion 1626.

The N processing components in connection with RAM 1624 generally operate to execute the instructions stored in nonvolatile memory 1620 to enable control of the individually-addressed pixels of the SLM. For example, non-transitory, processor-executable code to effectuate the methods described with reference to FIG. 14 may be persistently stored in nonvolatile memory 1620 and executed by the N processing components in connection with RAM 1624. As one of ordinarily skill in the art will appreciate, the processing portion 1626 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1626 may be configured to effectuate one or more aspects of the methodologies described herein (e.g., the method described with reference to FIG. 14). For example, non-transitory processor-readable instructions may be stored in the nonvolatile memory 1620 or in RAM 1624 and when executed on the processing portion 1626, cause the processing portion 1626 to perform individual addressing of the active pixels. Alternatively, non-transitory FPGA-configuration-instructions may be persistently stored in nonvolatile memory 1620 and accessed by the processing portion 1626 (e.g., during boot up) to configure the hardware-configurable portions of the processing portion 1626 to effectuate the functions of the individually-addressed pixel biasing device 1028.

The input component 1630 operates to receive signals that are indicative of one or more aspects of control of the active pixels. The output component generally operates to provide one or more analog or digital signals to effectuate an operational aspect of the individually-addressed pixel biasing device 1028. For example, the output portion 1632 may provide control signals for individually addressing the active pixels.

The depicted transceiver component 1628 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A spatial light modulator having a plurality of reflective phase-modulation pixels, the spatial light modulator comprising:
a first array of reflective phase modulation pixels having a first spatial frequency of N, and configured to apply a plurality of phase modulations to a central portion of a beam reflecting off the first array of pixels;
a first biasing circuitry coupled to the first array of pixels that biases the first array of pixels to impart phase delays to the central portion of the beam, thereby steering a majority of the central portion of the beam within a target range of angles;
a second array of border pixels arranged to surround the first array of pixels, the second array of pixels having a second spatial frequency of N', where N'>N, and configured to apply M different phase modulations to a peripheral portion of the beam; and a second biasing circuitry coupled to the second array of pixels that biases the second array of pixels to impart the M different phase delays to a majority of the peripheral portion of the beam, thereby steering a majority of the peripheral portion of the beam outside the target range of angles, where M is a number of different groups of pixels in the second array.

2. The spatial light modulator of claim 1, wherein M=1 or 2.

3. The spatial light modulator of claim 2, wherein each of the two-phase delays differs from the other by $B*\pi$, where B is an odd integer.

4. The spatial light modulator of claim 1, wherein the first biasing circuitry individually addresses pixels in the first array, and the second biasing circuitry addresses groups of electrodes in the second array.

5. The spatial light modulator of claim 1, wherein the border pixels are arranged in rows, columns, or a checkerboard.

6. The spatial light modulator of claim 1, the first array of pixels has two or more spatial frequencies, and wherein N is a highest spatial frequency thereof, and wherein the second array of pixels has two or more spatial frequencies, and wherein N' is a lowest spatial frequency thereof.

7. The spatial light modulator of claim 1, wherein the second array of pixels comprises mirrors.

8. A method of steering reflected light, the method comprising:
arranging an SLM in a path of a coherent beam of light;
arranging a first array of individually-addressed reflective phase modulation pixels to have a first spatial frequency of N;
individually biasing pixels of the first array to impart a plurality of phase modulations to a central portion of the beam;
arranging a second array of border pixels surrounding the first array of pixels, the second array of border pixels having a second spatial frequency of N', where N'>N;
biasing groups of pixels in the second array of border pixels to impart M phase modulations to a peripheral portion of the beam, where M is a number of different groups of pixels in the second array of border pixels.

9. A spatial light modulator comprising:
a first array of individually-addressed pixels having a first spatial frequency;
a second array of border pixels arranged around the first array, and having a second spatial frequency higher than the first spatial frequency;
control circuitry coupled to and biasing the first and second arrays to impart a plurality of phase modulations to the individually-addressed pixels and to impart an M number of phase modulations to the border pixels, where M is a number of electrically-connected groups of pixels in the second array, and a different phase modulation is imparted to each of the groups.

* * * * *